(12) United States Patent
Malviya et al.

(10) Patent No.: US 12,718,009 B2
(45) Date of Patent: Aug. 25, 2026

(54) AUTOMATED ELECTRONIC DOCUMENT CREATION THROUGH MACHINE LEARNING

(71) Applicant: INTUIT INC., Mountain View, CA (US)

(72) Inventors: Saket Malviya, Milpitas, CA (US); Patteaswaran Karivaradasamy, Frisco, TX (US); Shekhar Baggavalli Raju, New York, NY (US); Arpit Srivastava, Metuchen, NJ (US); Enkhbold Ochirbat, New York City, NY (US)

(73) Assignee: INTUIT INC., Mountain View, CA (US)

( * ) Notice: Subject to any disclaimer, the term of this patent is extended or adjusted under 35 U.S.C. 154(b) by 224 days.

(21) Appl. No.: 18/589,654

(22) Filed: Feb. 28, 2024

(65) Prior Publication Data

US 2025/0272482 A1 Aug. 28, 2025

(51) Int. Cl.

*G06F 40/186* (2020.01)
*G06F 40/205* (2020.01)
*G06F 40/30* (2020.01)
*G06V 30/412* (2022.01)

(52) U.S. Cl.

CPC .......... *G06F 40/186* (2020.01); *G06F 40/205* (2020.01); *G06F 40/30* (2020.01); *G06V 30/412* (2022.01)

(58) Field of Classification Search

CPC ....... G06F 40/186; G06F 40/205; G06F 40/30
See application file for complete search history.

(56) References Cited

U.S. PATENT DOCUMENTS 10,185,748 B1 * 1/2019 Ayzenshtat ........... G06F 16/248
2020/0242146 A1 * 7/2020 Kalukin .................... G06N 3/04
2023/0395067 A1 * 12/2023 Perkins ............... G06F 9/44505
2024/0160855 A1 * 5/2024 Xu ...................... G06F 16/9024

* cited by examiner

*Primary Examiner* — Seth A Silverman
(74) *Attorney, Agent, or Firm* — Patterson + Sheridan, LLP

(57) ABSTRACT

Aspects of the present disclosure relate to automated electronic document creation. Embodiments include providing, as inputs to a machine learning model, contents of a source electronic document and a prompt. Embodiments include receiving a particular data item from the machine learning model in response to the inputs. Embodiments include performing a lexical search for the particular data item among a plurality of stored data items. Embodiments include determining a confidence score based on the lexical search and performing a semantic search for the particular data item among the plurality of stored data items based on the confidence score not exceeding a threshold. Embodiments include identifying a stored data item of the plurality of data items that matches the particular data item based on the semantic search. Embodiments include automatically generating an electronic document by populating an electronic document template using the stored data item.

18 Claims, 7 Drawing Sheets

FIG. 4

AUTOMATED ELECTRONIC DOCUMENT CREATION THROUGH MACHINE LEARNING

INTRODUCTION

Aspects of the present disclosure relate to techniques for automatic creation of electronic documents such as invoices in software applications based on source electronic documents. In particular, techniques described herein involve utilizing machine learning techniques to dynamically extract data items from source electronic documents, utilizing dynamic matching algorithms to match extracted data items to elements in data stores, and automatically creating electronic documents based on the extracting and the matching.

BACKGROUND

Every year millions of people, businesses, and organizations around the world utilize software applications to assist with countless aspects of life. For example, many businesses rely on software applications for creating electronic documents such as invoices for billing customers for products and services. Some software applications provide user interfaces that are configured to allow users to create invoices, such as by entering information such as a customer name, identifying information of an item or service, a quantity, a rate (e.g., cost per unit of an item or service), and the like via user interface controls.

Utilizing software applications to create invoices and other types of electronic documents with conventional techniques may be a time-consuming, repetitive, and inefficient process. In some cases, creation of electronic documents using existing software applications results in inefficient use of time and computing resources, creating bottlenecks that prevent other tasks from being performed on a computing device. As such, there is a need in the art for improved techniques of electronic document creation.

BRIEF SUMMARY

Certain embodiments provide a method for automated generation of an electronic document. The method generally includes: providing, as inputs to a natural language processing machine learning model, contents of a source electronic document and a prompt that instructs the natural language processing machine learning model to extract a particular data item from the contents of the source electronic document; receiving the particular data item from the natural language processing machine learning model in response to the inputs; performing a lexical search for the particular data item among a plurality of stored data items; determining a confidence score based on the lexical search; performing a semantic search for the particular data item among the plurality of stored data items based on the confidence score not exceeding a threshold; identifying a stored data item of the plurality of data items that matches the particular data item based on the semantic search; and automatically generating the electronic document by populating an electronic document template using the stored data item.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts an example of an electronic source document related to automated electronic document creation.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
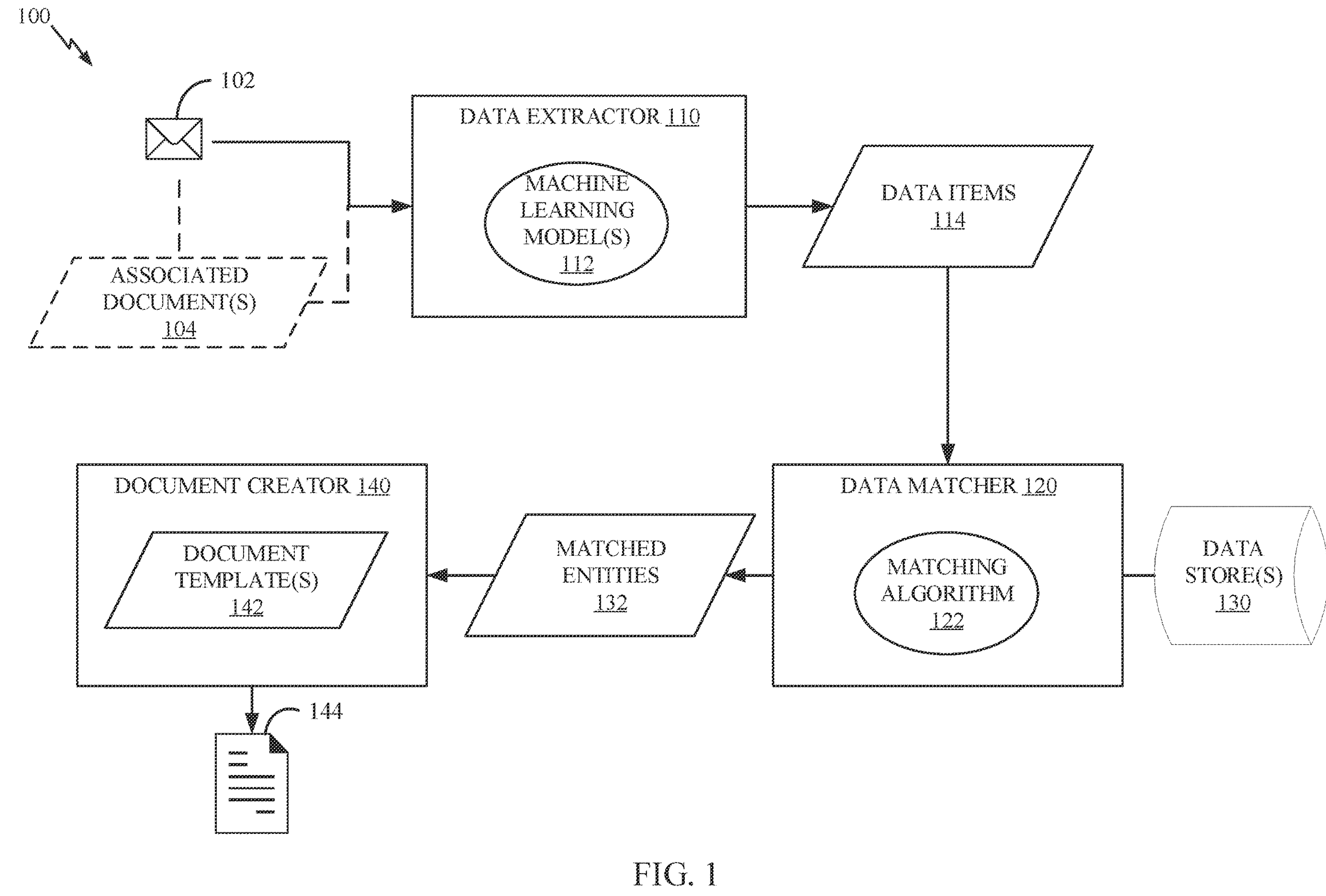
FIG. 1 depicts an example computing environment related to automated electronic document creation.

Aspects of the present disclosure provide apparatuses, methods, processing systems, and computer-readable mediums for automated electronic document creation.

A software application may allow for the creation of electronic documents (e.g., invoices, bills, receipts, refund documents, and/or the like), such as via a user interface with various controls that allow information related to the document to be entered by a user. In an example, a user enters identifying information of a customer, an item or service, a quantity, a rate, and/or the like via a user interface, and the application creates an invoice based on the entered information. Creating documents such as invoices can be an inefficient and repetitive process, particularly for larger businesses that create many invoices. Often, a business may create many invoices with the same or similar items, particularly when doing business repeatedly with particular customers.

Existing techniques for creating electronic documents using software applications are limited in their ability to automate aspects of the electronic document creation process due to the dynamic nature of many types of electronic documents. For example, the parties and items included in an electronic invoice may vary considerably between invoices. While there may be data available that could assist a software application in such automation, such as electronic records of communications relating to a given electronic document, this data is generally unstructured and not in a format that can be understood by the software application for the purpose of relating such information to creation of an electronic document.

Techniques described herein address these challenges associated with electronic document creation through a dynamic machine learning based process that allows relevant data to be automatically extracted from source electronic documents (e.g., electronic records of communications, such as emails) and matched to entities in data stores (e.g., known parties and other items that can be included in an electronic document) for use in automatically creating an electronic document. For example, aspects of the present disclosure may allow customer names, products or services, quantities, and other relevant data (e.g., related to a transaction) to be automatically extracted from emails and/or related documents (e.g., attachments) and matched to known customers, products or services, and/or the like in order to automatically populate an electronic invoice template with such information.

As described in more detail below with respect to FIG. 1, techniques described herein provide an end-to-end automated electronic document creation process based on source electronic documents even if such source electronic documents are not structured or otherwise in a format that allows a software application to natively identify relevant information. Machine learning techniques, such as a large language model (LLM), may be used to analyze and extract relevant data from a source electronic document, such as based on specific instructions and/or examples provided in a prompt to such a model, as described in more detail below with respect to FIG. 2. Once a data item is extracted from a source electronic document (e.g., relating to a transaction), a dynamic matching algorithm may be used to match the data item to one or more known entities in a data store through lexical and/or semantic matching techniques, as described in more detail below with respect to FIG. 3. Determining matches between data items extracted from a source electronic document and known entities in a data store may then allow an electronic document template to be automatically populated with details of known entities (e.g., related to a transaction), as described in more detail below with respect to FIGS. 4 and 5.

Electronic documents that are automatically created using techniques described herein may be displayed via a user interface for review, editing, approval, and/or rejection by a user. Feedback received with respect to an electronic document from the user may be used to dynamically update aspects of the logic used to automatically create future electronic documents. For example, a matching algorithm may be updated and/or a machine learning model may be re-trained or fine-tuned based on such user feedback in order to reduce false positives and improve the functioning of the system on an ongoing basis.

Embodiments of the present disclosure provide multiple improvements over conventional techniques for electronic document creation. For example, by utilizing the dynamic machine learning based techniques described herein to automatically extract relevant data items from source electronic documents, match extracted data items to known entities in a data store, and automatically create an electronic document based on such matching, embodiments of the present disclosure allow for a significant reduction in time, repetition, and computing resource utilization (e.g., utilization of resources such as processing, memory, display, input device, etc.) that would otherwise be associated with the manual or less-automated creation of the electronic document through interaction with a user interface. By providing particular context information such as domain-specific instructions and/or examples in a prompt to a machine learning model along with a source electronic document, techniques described herein allow such a model to function with a higher level of accuracy and to correctly extract relevant data items from the source electronic document even when the model has not been directly or extensively trained for a domain to which the extraction task relates (e.g., electronic invoice creation for a particular user). As used herein, a "domain" may refer to a particular subject, purpose, or context, such as the creation of a specific type of electronic document (e.g., invoices), the creation of electronic documents for a particular user or entity or set of users or entities, a particular software application, and/or the like.

Furthermore, by utilizing a dynamic matching algorithm to match extracted data items to known entities in a data store, such as using a combination of exact lexical matching, fuzzy lexical matching, and/or semantic matching in a manner that is dynamically adapted based on circumstances such as a category (which may also be referred to as type) of the data item, a category of entity that is being search for, and/or a result of an intermediate stage of the matching algorithm, techniques described herein improve upon existing techniques for automatically matching items in software applications through a more tailored and adaptable approach. Thus, matching algorithms described herein reduce false positives and avoid performing types of matching techniques that are unlikely to be useful in a particular context, thereby avoiding the computing resource utilization that would otherwise be associated with such techniques. For example, if a lexical search produces a result with a confidence score above a threshold, a semantic search and accompany resource utilization may be avoided according to rules of a matching algorithm as described herein. In another example, if a data item is of a type that is well suited to an exact lexical search, such as an item number or other standardized identifier, a fuzzy lexical search and/or semantic search and accompanying computing resource utilization may be avoided according to rules of a matching algorithm as described herein.

Aspects of the present disclosure make use of particular machine learning and automated matching techniques to derive domain-specific and relevant information from source electronic documents that may not be structured or formatted in a manner that would otherwise allow such information to be understood by a computing application for a given domain, and thereby enable a computing application to understand and use such information to automatically create electronic documents in a manner that was not possible with prior techniques.

By utilizing input and feedback from the user to iteratively improve aspects of the automated document creation process, such as through updating the matching algorithm and/or re-training or fine-tuning the machine learning model based on such feedback, techniques described herein provide a continuously-improving feedback loop that reduces false positives and improves performance with each successive iteration.

Additionally, techniques described herein may avoid errors that could otherwise be introduced through the manual creation of electronic documents, thereby avoiding processing, storage, and communication resource utilization associated with auditing, correcting and/or re-sending electronic documents created using software applications.

While certain components of the techniques described herein may be known, embodiments of the present disclosure involve combinations of these components that provide benefits beyond the benefits separately provided by each individual component. For instance, while machine learning techniques in a general sense may be known in the art, and while the use of matching algorithms in a general sense may be known the art, techniques described herein utilize a dynamic combination of these components where the output from a machine learning model is used in conjunction with a dynamic matching algorithm with respect to a data store associated with a particular domain to gain actionable insight from a source electronic document, thereby allowing electronic documents to be automatically created using domain-specific information identified through this unique combination of techniques. As such, techniques described herein automatically create electronic documents that are more dynamically informed and therefore more accurate than electronic documents that could otherwise be produced by a general machine learning technique on its own or through a conventional matching algorithm on its own.

Example Computing Environment for Automated Electronic Document Creation

FIG. 1 depicts an example computing environment 100 related to automated electronic document creation, according to aspects of the present disclosure. Computing environment 100 includes various computing components that perform techniques for extracting data items from electronic source documents, matching extracted data items to entities in data stores, and automatically creating electronic documents based on the extracting and matching. These computing components may be implemented via one or more computing devices, such as system 700 of FIG. 7, described below.

A source electronic document 102 (and, in some embodiments, one or more associated documents 104) are processed by a data extractor 110 using one or more machine learning models 112 in order to extract data items 114. In one example, source electronic document 102 is an electronic record of a communication related to a transaction, such as an email. Associated document(s) 104 may, for example, be one or more attachments to such an email, and/or may otherwise be referenced by or associated with source electronic document 102. An example of a source electronic document 102 is described below with respect to FIG. 4.

Data extractor 110 generally performs operations related to using one or more machine learning models 112 to extract relevant data items from source electronic documents. In an embodiment, data extractor 110 is configured to provide inputs to a machine learning model 112 based on source electronic document 102 (and, in some embodiments, associated document(s) 104) along with a prompt. In some embodiments, data extractor 110 first extracts text from source electronic document 102 (and, in some embodiments, associated document(s) 104), and then provides the extracted text as inputs to the machine learning model 112. The prompt may include natural language instructions to extract particular types of data items from the input document content, and may include context information to aid in the extraction, such as domain-specific instructions and/or examples that demonstrate how the machine learning model 112 should perform the extraction under particular conditions.

In one example, a machine learning model 112 is a natural language processing machine learning model such as a large language model (LLM) (e.g., a generative pre-trained (GPT) model), that has been trained on a large set of training data (e.g., across a plurality of domains), and is capable as a result of such training to perform a wide variety of language-related tasks in response to natural language prompts. Training of the machine learning model 112 may involve supervised and/or unsupervised machine learning techniques. In some embodiments the machine learning model 112 has been fine-tuned for one or more particular domains, such as for use with a particular software application or for a specific purpose, while in other embodiments the machine learning model 112 has been trained in a more general fashion and has not been fine-tuned in such a manner.

The prompt provided to the machine learning model 112 may, for example, specify that the machine learning model 112 is to populate a set of variables or fields in a particular structured object, such as a JavaScript Object Notation (JSON) object, with data extracted from the input document content according to certain rules. For example, the prompt may specify the variables and/or fields to be populated, and may be provide domain-specific instructions and/or examples to aid in the extraction. In one embodiment, the prompt instructs the machine learning model 112 to identify a main intent of input document content, specifies a list of possible intents that can be identified, and indicates intent-specific rules for extracting data items when each of the possible intents is identified. Intent-specific rules may, for example, include rules indicating that if a particular intent is identified then the machine learning model 112 is to categorize and/or parse the input document content in a particular manner. One example of such a rule is an indication that if the general intent of the document content is "transactional," then the machine learning model 112 is to determine if the document content resembles a purchase order from a customer and, if it does resemble such a purchase order, to categorize the document content as a "sales invoice". Another example of such a rule is an indication that if the general intent of the document content is "transactional," then the machine learning model 112 is to populate a TransactionType variable (e.g., one of the variables included in the list of variables to be populated that is provided in the prompt) with only one option selected from: sales invoice, purchase bill, estimate, or unknown. The prompt may also instruct the machine learning model 112 to extract certain data items only if mentioned explicitly in the input document content, such as a product identification number or stock keeping unit (SKU), a quantity, and/or the like. The prompt may also instruct the machine learning model 112 to derive terms associated with a transaction, and may indicate how a "terms" variable is to be populated, such as indicating that if the input document content specifies a commitment to make payment after one week of receiving an invoice then the terms should be populated with "net 7 days" or the like. In some cases, the prompt instructs the machine learning model 112 to populate certain variables with an empty string (e.g., " ") under certain conditions, such as if certain intents or conditions cannot be identified in the input document content. In some cases, the prompt may further specify that the machine learning model 112 is to capture any additional available data about particular entities such as a customer or vendor, such as a name, email, phone number, address, company name, and/or the like.

The machine learning model 112, in response to being provided with the prompt and the input document content, may output extracted data items 114, such as in the form of a structured object (e.g., JSON object) with relevant variables populated with extracted information, according to the instructions included in the prompt. For example, the machine learning model 112 may be a neural network that processes the input document content through various layers (e.g., constructed through a training process based on a large training data set) according to the prompt in order to extract and output data items 114. Operation of data extractor 110 is described further below with respect to FIG. 2.

Data items 114 are provided to a data matcher 120, which is configured to perform operations related to matching data items 114 to elements in one or more data stores 130. Data store(s) 130 generally represent databases, repositories, and/ or other data storage entities that contain data related to one or more software applications. In one example, a data store 130 is associated with a financial management software application and incudes data related to a user (e.g., business), such as names and information of customers, information about inventory items such as products or services (e.g., names, identifiers, descriptions, prices, and/or the like), and other types of information. Such information may be provided by a user and/or otherwise determined or retrieved, such as from one or more separate data sources.

Data matcher 120 applies a matching algorithm 122 in order to dynamically match data items 114 to entities in data store(s) 130. In some embodiments, matching algorithm 122 involves dynamically selecting lexical and/or semantic matching techniques based on categories of data items 114 and/or based on results of prior matching operations. In one example, a determination is made of whether to perform an exact lexical search or a fuzzy lexical search based on a category of a given data item 114 or a category of entity that is being searched for in the data store. An exact lexical search generally involves a search of one or more data stores 130 for an exact sequence of characters. A fuzzy lexical search generally involves a search of one or more data stores 130 for a sequence of characters while allowing some amount of difference (e.g., not requiring an exact match but allowing some amount of variation). Some types of data items may be well suited to an exact lexical search, while other types of data items may not be well-suited to an exact lexical search. For example, a numerical identifier such as a SKU may be well-suited to an exact lexical search because such an identifier is unlikely to be represented in different ways in different places. By contrast, a name of a product or service may not be well-suited to an exact lexical search because such data items may be represented in different ways in different places (e.g., due to abbreviations, differing terminology, spelling variations, typographical errors, and/or the like). Thus, matching algorithm 122 may involve dynamically determining whether to apply an exact lexical search or a fuzzy lexical search for a given data item 114 based on a category of the given data item 114 (e.g., the category of the given data item may be indicated by the output from the machine learning model, such as by the variable in a structured object that the data item corresponds to) or a category of entity that is being searched for in the data store. It is noted that an entity in a data store may include stored data items, such as particular items of data about the entity. In an example, an entity is a product and a stored data item within the entity is a name of the product. An entity may be identified as a match based on one or more stored data items within the entity being matched to one or more data items from a source electronic document. In other embodiments, an entity may be referred to as a stored data item.

Some types of data items, such as longer strings, may not be well-suited to a lexical search at all. As such, in some cases, matching algorithm 122 may involve performing a semantic search either based on a category of the data item or based on a result of an initial lexical search (e.g., if a confidence score produced by a lexical search does not exceed a threshold). A semantic search generally involves a search for entities that have a similar semantic meaning to a given data item, such as based on embeddings. For example, an embedding of a given data item 114 may be generated and compared to embeddings of entities in data store(s) 130 using a similarity measure such as cosine similarity. An embedding generally refers to a vector representation of an entity that represents the entity as a vector in n-dimensional space such that similar entities are represented by vectors that are close to one another in the n-dimensional space. Embeddings of data items 114 and entities in data store(s) 130 may be generated through the use of an embedding model, such as a neural network or other type of machine learning model that learns a representation (embedding) for an entity through a training process that trains the neural network based on a data set, such as a plurality of features of a plurality of entities. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating embeddings are possible. Two embeddings may be considered a match with one another if they are within a threshold distance of one another, such as based on a cosine similarity computation. In some embodiments, a semantic search is only performed for a data item 114 if a lexical search is unsuccessful and/or if a confidence score associated with a result of a lexical search (e.g., exact and/or fuzzy) does not exceed a threshold. In such embodiments, a semantic search may be avoided if a lexical search returns a match with a confidence score above a threshold. In other embodiments, an exact lexical search, a fuzzy lexical search, and/or a semantic search may be performed for every data item regardless of type/category. For example, confidence scores associated with results of such searches may be boosted or weighted differently according to rules and/or based on categories of data items.

One or more confidence scores associated with results of performing one or more lexical and/or semantic searches may be used to determine a final match score between a given data item 114 and an entity in data store 130. For example, a lexical confidence score and a semantic confidence score may be combined (e.g., through a weighted average, where different types of searches are weighted differently based on categories of data items) and/or normalized to produce a final match score that is used to determine whether a match has been found. In some cases, a match may be based on comparing multiple data items 114 to information associated with a single entity in a data store 130. For example, if data items 114 includes a name, address, email, phone number, and/or business name associated with a single person (e.g., customer), each of these data items may be compared to corresponding information associated with a given person (e.g., customer) in a data store 130 using one or more matching techniques that are dynamically selected based on each individual data item in order to determine whether the overall entity (e.g., customer) is a match. In another example, if data items 114 includes a name and a description of a single item (e.g., product or service), each of these data items may be compared to corresponding information associated with a given item (e.g., product or service) in a data store 130 using one or more matching techniques that are dynamically selected based on each individual data item in order to determine whether the overall entity (e.g., product or service, or particular variant of a product or service) is a match. Results of various searches or matching techniques may be normalized, such as to produce confidence scores between 0 and 1, so that such results can be compared at a common scale. In some cases, a boost is given to one or more confidence scores involved in matching algorithm, such as based on a category of a given data item 114. For example, if a category of a given data item is such that a semantic search is expected to provide more accurate results than a lexical search, then the confidence score associated with results of a semantic search for the given data item may be boosted or weighted more highly than one or more corresponding confidence scores associated with results of an exact lexical search and/or a fuzzy lexical search for the given data item when computing the final match score. In certain embodiments, a confidence score produced by a given search type that does not exceed a particular threshold is excluded from the final match score computation in order to reduce noise. Operation of data matcher 120 is described further below with respect to FIG. 3.

One or more matched entities 132 resulting from the matching algorithm 122 performed by data matcher 120 are provided to a document creator 140, which is configured to perform operations related to automatically creating an electronic document 144. For example, matched entities 132 may include one or more entities from data store(s) 130 that have been matched to one or more data items 114. In one particular example, matched entities 132 includes a customer's name and information, one or more products or services being purchased by the customer, the details of such products or services, the quantities of such products or services that are being purchased, and/or the like.

Document creator 140 may use one or more document templates 142 in order to automatically generate an electronic document 144 based on matched entities 132. For example, a document template 142 may be a template of an electronic invoice that includes one or more fields or variables that can be dynamically populated based on matched entities 132. Document creator 140 may insert information associated with matched entities 132 into appropriate fields and/or variables of such a document template 142 in order to create electronic document 144. For example, as described in more detail below with respect to FIG. 5, electronic document 144 may be an electronic invoice that includes details of a particular customer and details of one or more particular items and/or services for which the particular customer is being billed.

In some embodiments, electronic document 144 is displayed via a user interface after being automatically created. A user (e.g., a representative of a business) may review electronic document 144 via the user interface, and may interact with one or more user interface controls to provide feedback with respect to electronic document 144, such as editing, accepting, and/or rejecting electronic document 144. This user feedback may be used to modify matching algorithm and/or one or more machine learning models 112 in an interactive feedback loop for improved performance. For example, if the user modifies a value in electronic document 144, this modification may be used as a ground truth label in order to fine-tune or re-train a machine learning model 112 to correctly extract such a value in the future. Such a modification of a value may also or alternatively be used to update matching algorithm 122 so that such a value is more accurately matched in the future. For example, if a semantic search for a corresponding data item had returned a high confidence value in the matching process, then the user's subsequent modification or rejection of a value that is based on such a match may indicate that semantic searches are not well-suited for the category of that data item, and matching algorithm 122 may be modified such that semantic searches are not performed or are weighted less highly for that category of data item in subsequent matching operations. A user's approval of electronic document 144 may be used as a ground truth label indicating that the outputs from machine learning model(s) 112 and/or matching algorithm 122 were correct, and may be used to reinforce and/or re-train these aspects of the system.

In some embodiments, electronic document 144 may be transmitted to one or more parties upon approval by a user. For example, if electronic document 144 is an electronic invoice, then the invoice may be sent to a customer when it is approved by a user via a user interface.

It is noted that computing environment 100 is included as an example of computing components that may implement techniques described herein, and such techniques may be implemented using more or fewer components. Furthermore, examples described herein with respect to certain types of electronic documents, such as invoices, are not limiting, and embodiments of the present disclosure may also be performed to dynamically create other types of electronic documents based on information automatically extracted from a wide variety of types of electronic source documents and matched to a wide variety of types of entities.

Dynamic Extraction of Data from Source Electronic Documents

Figure 2:
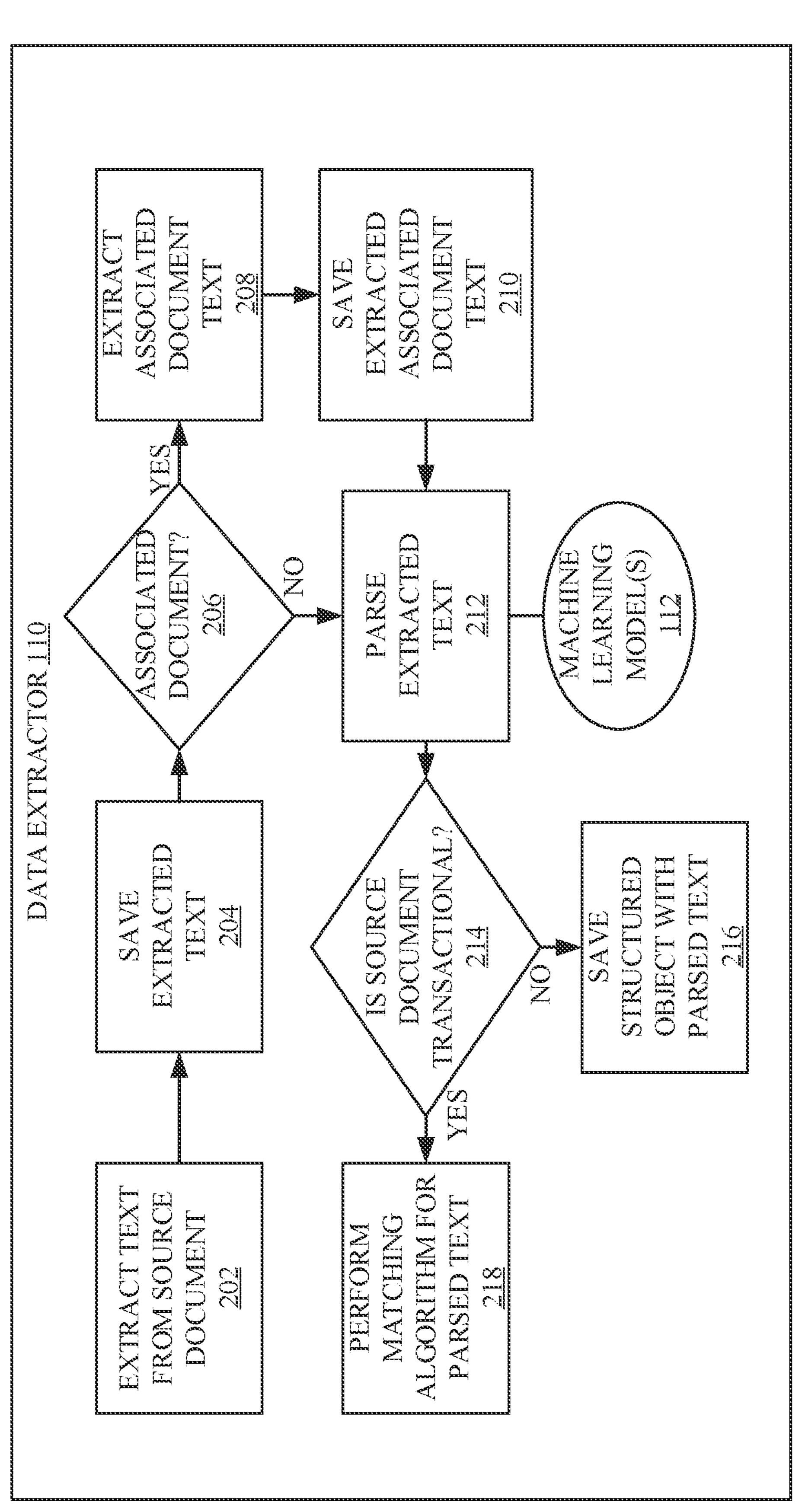
FIG. 2 depicts an example workflow for automatic extraction of data items from a source electronic document in connection with automated electronic document creation.

FIG. 2 is an illustration of an example workflow for automatically extracting data items from a source electronic document and/or from associated electronic documents. FIG. 2 includes data extractor 110 and machine learning model(s) 112 of FIG. 1, and generally represents operations that may be performed by such a data extractor and/or machine learning model.

At step 202, data extractor 110 extracts text from a source document such as source electronic document 102 of FIG. 1. Extracting text from the source document may involve identifying text present in an email or other type of document format that natively includes machine-readable text. In some cases, extracting text from the source document may involve performing optical character recognition (OCR) techniques or other text identification techniques in order to detect text present in the document, such as if the document is in the form of an image or other format that does not natively include machine-readable text.

At step 204, the text extracted at step 202 is saved (e.g., in memory or persistent storage). At decision 206, a determination is made of whether there are any associated document(s), such as attachments or other documents that are referenced by and/or otherwise associated with the source document. If one or more associated documents are identified, then operations proceed to step 208 where text is extracted from the one or more associated documents (e.g., in a similar manner to that described above with respect to step 202) and then to step 210 where text extracted from the one or more associated documents is saved (e.g., in memory or persistent storage). If there are no associated documents, then operations proceed to step 212, where the extracted text is parsed.

Step 212 involves the use of one or more machine learning models 112 to parse the text extracted from the source document (at step 202) and/or from one or more associated documents (at step 208, if such a step is performed). For example, the extracted text may be provided to a machine learning model 112 along with a prompt that instructs the machine learning model 112 to generate a structured object (e.g., a JSON object) containing one or more variables that are populated based on the input text. An example of such a prompt may include such natural language instructions as "I need you to analyze both the email content and the attached content (provided as transcribed text) of the following email" and "using this information, generate a structured output following the provided object structure," with a delineation of the structure of the object, such as including variables like intent, transaction type, transaction identifier, action, terms, product information such as variant name, product name, description, SKU, quantity, unit of measure, and price, customer or vendor information such as name, email, phone number, address, and company name, and/or the like. The prompt may further include natural language instructions such as "now, follow these steps: (1) identify the main intent of the email based on both email and attachment content" and "the potential intents could be: inquiry, order, transaction, shipping, marketing, feedback, support, billing, account update, others." The prompt may further instruct machine learning model 112 to take certain actions if certain conditions are met, such as apply certain rules if the intent is determined to be transactional. The rules may include indications such as to categorize an email as a sales invoice if it resembles a purchase order for a customer, to categorize an email as a purchase bill if it resembles an invoice from a vendor, or to categorize a request for a quote as an estimate. The prompt may also include other types of instructions, such as indicating that certain data items should only be extracted if they are mentioned explicitly in the email or attachment and/or indicating that an intended action in the email should be identified if possible, such as giving examples of potential actions like creating a transaction or updating a transaction. These are included as examples, and other instructions and rules may also or alternatively be included in the prompt. The prompt may be based on domain-specific knowledge and/or experimentation.

The machine learning model 112 may output extracted data items, such as in the form of a structured object, according to the instructions in the prompt. At decision 214, data extractor 110 determines whether the source document is transactional, such as based on an intent included in the data items output by the machine learning model 112. If the intent is transactional, then operations proceed to step 218, where a marching algorithm is performed for the parsed text, as described in more detail below with respect to FIG. 3. If the intent is not transactional, then the structured object with the parsed text is saved at step 216 (e.g., in memory or persistent storage), and matching may not be performed. For example, in some embodiments the matching algorithm is only performed for transactional source documents because those are the types of source documents that may be used to automatically create an electronic document such as an invoice.

Example Automatic Matching of Extracted Data Items to Entities in Data Store

Figure 3:
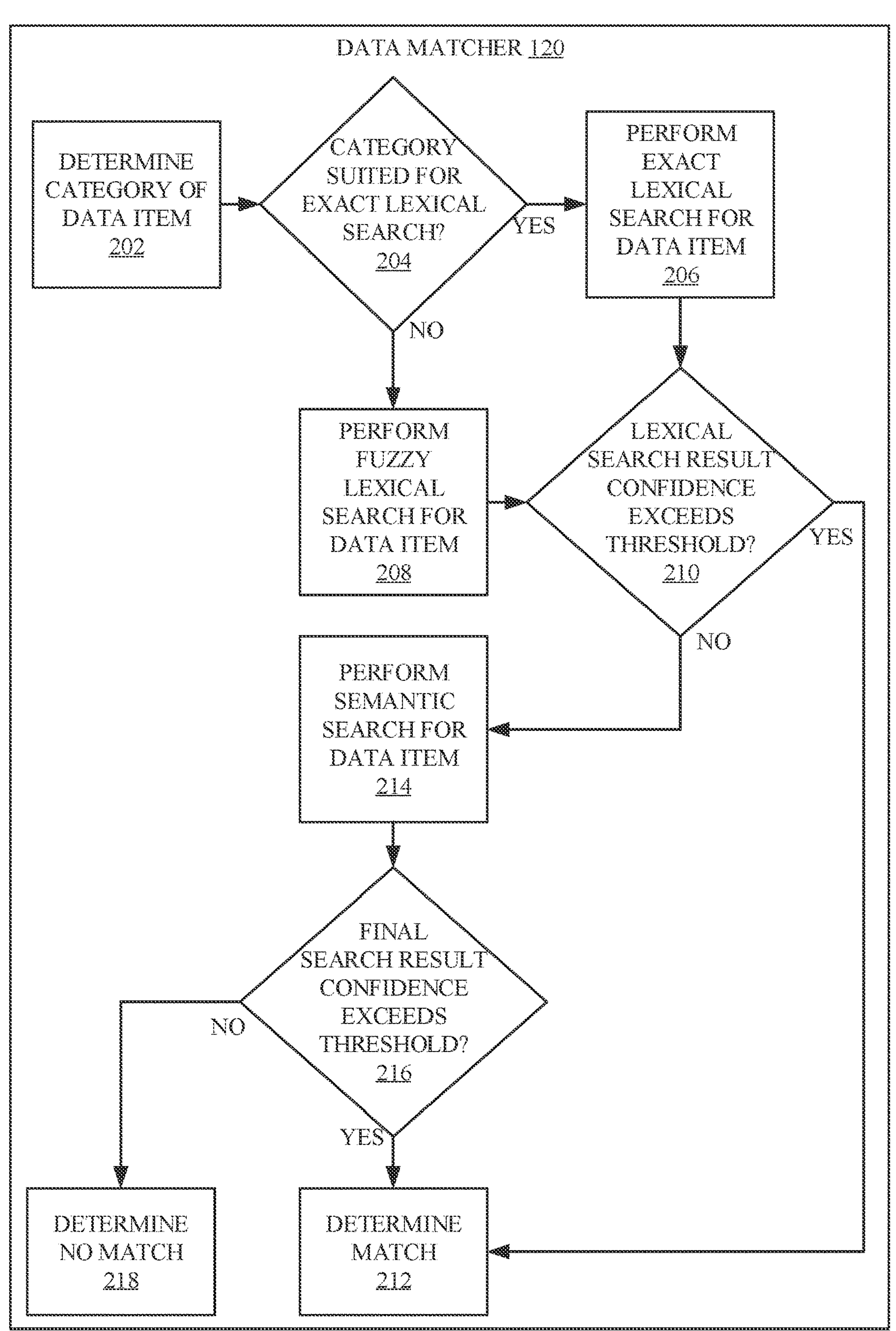
FIG. 3 depicts an example workflow for automatic matching of data items extracted from a source electronic document to elements in a data store in connection with automated electronic document creation.

FIG. 3 depicts an example workflow for automatic matching of data items extracted from a source electronic document to elements in a data store in connection with automated electronic document creation. FIG. 3 includes data matcher 120 of FIG. 1.

At step 202, data matcher 120 determines a category of a data item. The data item may, for example, have been extracted by data extractor 110 of FIGS. 1 and 2 from a source electronic document or an associated electronic document as described above, and may be included in a structured object such as a JSON object. Data matcher 120 may determine whether the category of the data item corresponds to one or more rules related to performing a matching algorithm, such as indicating the matching or search techniques that are to be used for certain categories of data items.

At decision 204, data matching 120 determines whether the category of the data item determined at step 202 is suited for an exact lexical search, such as based on one or more rules. If the category is suited for an exact lexical search (e.g., if the category of the data item is a numerical identifier such as a SKU, which may be indicated in a rule as being suited for an exact lexical search), the operations may continue at step 206 where data matcher 120 performs an exact lexical search for the data item (e.g., in one or more data stores 130 of FIG. 1). An exact lexical search may be a search for an exact match of a series of characters. If the category is not suited for an exact lexical search, then operations may proceed at step 208, where a fuzzy lexical search is performed for the data item. A fuzzy lexical search may be a search for a string of characters that allows some amount of variation, such as determining a match between two strings if a similarity measure between the two strings exceeds or does not exceed a threshold (e.g., based on edit distance, based on a number of shared characters, and/or the like).

Whether an exact lexical search is performed at step 206 or a fuzzy lexical search is performed at step 208, operations proceed to decision 210, where data matcher 120 determines if a confidence score associated with one or more results of the lexical search exceeds a threshold. For example, the exact lexical search and/or the fuzzy lexical search may result in identifying a potential match having a respective confidence score indicating a likelihood that the match is correct (e.g., based on a degree or amount of similarity). If a confidence score associated with a result of the lexical search exceeds a threshold, then operations may proceed to step 212, where a match is determined (e.g., the potential match produced by the lexical search is determined to be a match if its confidence score exceeds a threshold). Otherwise, if the confidence score(s) associated with the one or more result of the lexical search do not exceed the threshold, then operations may continue at step 214, with performing a semantic search for the data item.

Performing a semantic search may involve generating an embedding of the data item and comparing the embedding of the data item to corresponding embeddings of entities in data store(s) 130 of FIG. 1, such as using cosine similarity or another similarity measure. The semantic search may also produce a confidence score associated with a result.

A final confidence score may be generated based on one or more confidence scores produced by an exact lexical search, a fuzzy lexical search, and/or a semantic search. It is noted that while certain embodiments may involve selecting which of these types of searches to perform and excluding certain types of searches based on the category of data item and/or the results of successive searches, other embodiments involve performing some or all of these types of searches (e.g., an exact lexical search, a fuzzy lexical search, and/or a semantic search) for some or all data items and aggregating results of the different types of searches that are performed in order to produce a final confidence score. For example, if a fuzzy lexical search for a product name from an email (e.g., "fettucine pasta") resulted in a potential match with an entity in the data store (e.g., "fettucine noodles") with a confidence score of 0.65 and a semantic search resulted in a match between these same two items with a confidence score of 0.98, then these two confidence scores may be aggregated in some manner to produce a final confidence score. In one embodiment, all confidence scores for a given match are averaged to produce a final confidence score for the given match. In another embodiment, different weights or boosts are applied to confidence scores produced by different types of searches, such as according to rules and/or the category of the data item. For instance, for numerical identifiers, exact lexical searches may be weighted more highly than fuzzy lexical searches and semantic searches, and fuzzy lexical searches may be weighted more highly than semantic searches (e.g., because numerical identifiers do not necessarily have semantic meaning, and are primarily lexical). In another example, for product names, semantic searches may be weighted more highly than any type of lexical search (e.g., because product names may be represented with different terminology, abbreviations, and spelling (e.g., due to variations and/or typographical errors), while the semantic meaning is likely to remain similar across these different representations). In one example, a final confidence score for a given match is determined by computing a weighted average of two or more confidence scores produced by an exact lexical search, a fuzzy lexical search, and/or a semantic search. If only one type of search is performed, then the final confidence score for a given match may be the confidence score produced by that one type of search. It is noted that confidence scores produced by one or more searches may be normalized so that they are in a common scale, such as between zero and one. In certain embodiments, a confidence score produced by a given search type that does not exceed a particular threshold (e.g., a threshold below which search results have historically not been useful) is excluded from the final confidence score computation for the given match in order to reduce noise.

At decision 216, data matcher 120 determines if the final search result confidence score for a given match exceeds a threshold. If the final search result confidence score for a given match exceeds the threshold, then operations continue at step 212, where a match is determined (e.g., the given match, which is at first only a potential match, is determined to be a match if its confidence score exceeds a threshold). If the final search result confidence score for a given match does not exceed the threshold, then operations continue at step 212, where no match is determined (e.g., the potential match is determined not to be a match).

It is noted that no particular type of search is necessarily performed in any given execution of the match algorithm. For example, some embodiments may involve determining no match and also determining not to perform a semantic search if a confidence score produced by one or more lexical searches is below a lower threshold. Alternative implementations may involve any combination of search types. None of the steps or decisions depicted in FIGS. 2 and 3 are intended to represent the only manner of performing a data extraction process or a match algorithm according to embodiments of the present disclosure, and other implementations and logical paths are possible.

Example Source Electronic Document

Figure 4:
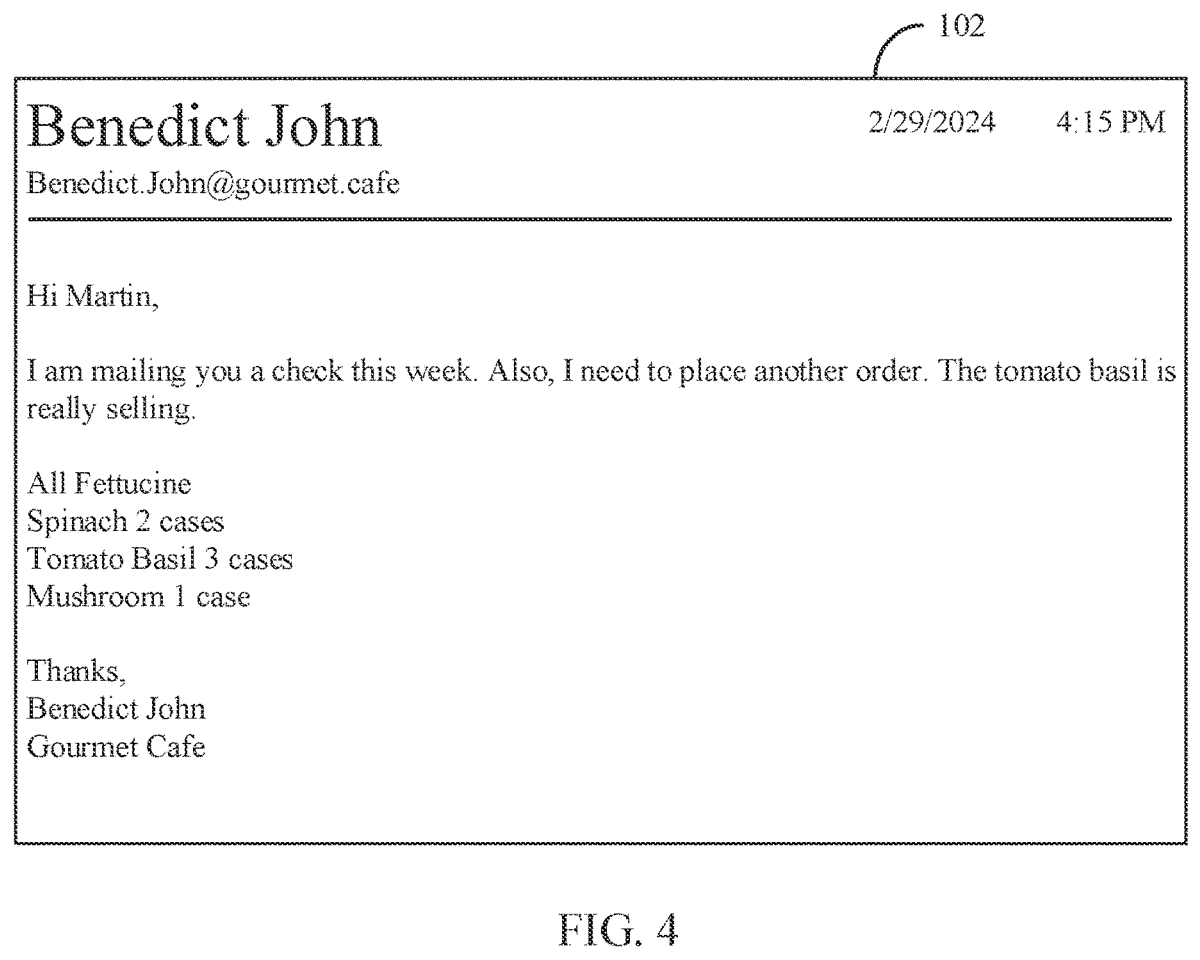

FIG. 4 is an illustration of an example source electronic document related to automated electronic document creation. FIG. 4 includes source electronic document 102 of FIGS. 1 and 2, and represents an example of such a source electronic document. It is noted that other types of electronic source documents may alternatively be used with embodiments of the present disclosure.

In FIG. 4, electronic source document 102 may be an email sent by a customer to a business. The email is from a sender named "Benedict John" and was sent on Feb. 29, 2024 at 4:15 PM.

The email in FIG. 3 includes the following text in a body of the email:

Hi Martin,

I am mailing you a check this week. Also, I need to place another order. The tomato basil is really selling.

All Fettucine

Spinach 2 cases

Tomato Basil 3 cases

Mushroom 1 case

Thanks,

Benedict John

Gourmet Cafe

While not depicted, the email may also have one or more attachments. The attachment(s) may be in a text format and/or may be images or otherwise may not contain machine-readable text. In one example, an attachment to the email includes a picture of an empty shelf marked tomato basil fettucine pasta.

The business (or its representative) may be a user of a financial management software application, and may have configured the software application to receive incoming emails directed to the business. For example, incoming emails directed to the business may be routed via a web service to a data store or "bucket" and the software application may receive the email via a subscription to a service that informs the software application when new emails are available and/or sends such emails to the software application. The email (and any attachments) may be received by data extractor 110 of FIGS. 1 and 2, as described above. The email (and any attachments) may be processed in order to extract one or more data items from the email and/or attachments, match the extracted one or more data items to one or more entities in a data store, and automatically generate an electronic document based on the extracting and the matching.

Figure 5:
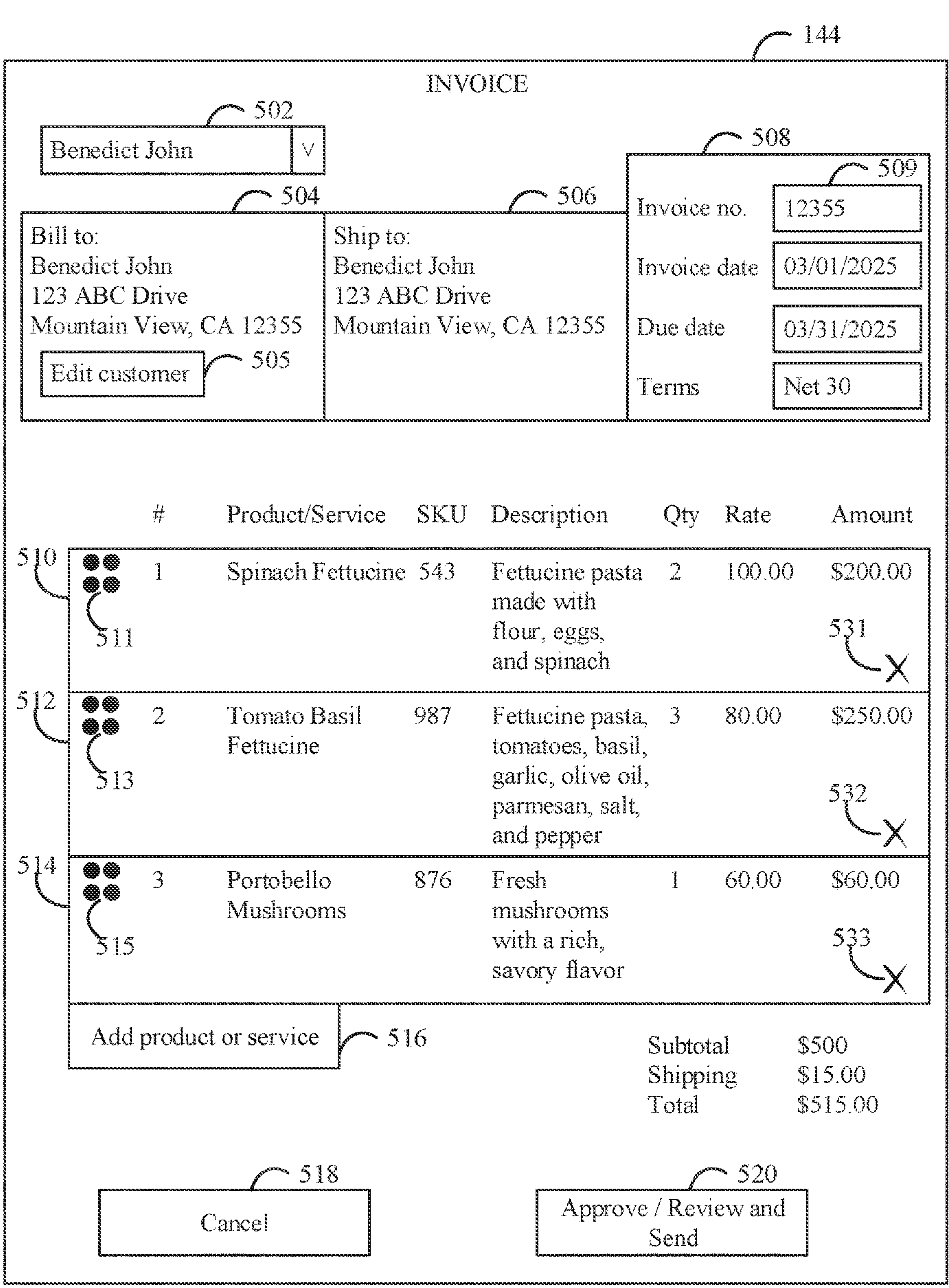
FIG. 5 depicts an example of an automatically created electronic document.

Example Electronic Document Automatically Created Using Techniques Described Herein FIG. 5 is an illustration of an example of an automatically created electronic document. FIG. 5 includes electronic document 144 of FIG. 1, and represents an example of such an electronic document that may be automatically created using techniques described herein. It is noted that other types of electronic documents (e.g., refunds, receipts, records, and/or the like) may alternatively be created in embodiments of the present disclosure.

In an example, the electronic document 102 in FIG. 5 is an electronic invoice created based on the email depicted in FIG. 4. The invoice may be displayed in a user interface that allows a user to review contents of the invoice, edit aspects of the invoice, approve the invoice, and/or reject the invoice.

The invoice includes a customer name field 502 that has been automatically populated with "Benedict John". Field 502 may be associated with a drop-down list that allows the user to select alternative customer names from the user's list of customers, and/or may be an editable field that allows the user to type in a different name.

The invoice further includes a billing information field 504 that has been automatically populated with an address of Benedict John. For example, a match may have been determined between the sender of the email and a customer in the user's list of customers (e.g., the customer may be an entity in a data store 130 of FIG. 1), and the known information of that customer (Benedict John), such as in a data store 130 of FIG. 1, may have been used to populate field 504 with the customer's billing address. Field 504 (or another portion of the invoice) may also include a control 505 that, when selected, allows the user to edit the customer's data (e.g., a popup window or different user interface screen may displayed in which the user can edit the customer's billing address and/or other information).

Similarly, the invoice includes a shipping information field 506 that has been automatically populated with a shipping address of Benedict John. The shipping address may be the same or different than the billing address, and may also be determined from information known about the customer (e.g., such information may be stored in a data store 130 of FIG. 1) based on a match between a data item from the source document (e.g., the sender's name from the email) and an entity in the data store (e.g., the name of one of the user's customers).

The invoice further includes an invoice details field 508, which includes details of the invoice. Fields within the invoice details field 508 may include an invoice number, an invoice date, a due date, and terms of the invoice. Field 509, for example, has been automatically populated with an identifier of the invoice. These fields in invoice details field 508 may be automatically populated based on rules and/or contextual information. For example, the invoice number may be randomly or sequentially generated, the invoice date may be determined based on the current date, the due date may be determined based on the invoice date and a billing period length (e.g., 30 days), and the terms may be determined based on rules associated with the user and/or based on information extracted from the source document(s). For instance, "net 30" may mean that the net amount is due in 30 days.

The invoice further includes items 510, 512, and 514, which represent items for which the customer is being invoiced, and which have been automatically populated with information based the extracting and matching described above with respect to FIGS. 1-4. For example, item 510 is for a product named "spinach fettucine," has a SKU of 543, a description, a quantity of 2, a rate of 100.00, and an amount of $200.00. The details of item 510 may have been determined based on a match between "All fettucine" and "Spinach 2 cases" extracted from the email of FIG. 4 and an entity in the data store that corresponds to a product (spinach fettucine) offered by the user. The product name, SKU, description, and rate may have been determined based on known information associated with this product in the data store. The quantity may have been determined based on the email (e.g., "2 cases"). The amount may have been determined based on the rate and the quantity. The details of items 512 and 514 may have been determined and populated in a similar manner.

Items 510, 512, and 514 further include controls 511, 513, and 515, which, when selected, allow a user to drag and drop these items within the list of items, such as to re-order the items within the invoice. Furthermore, 510, 512, and 514 further include controls 531, 532, and 533, which, when selected, allow a user to delete these items (e.g., remove an item from the invoice).

Control 516 may be configured to, when selected, allow the user to add one or more additional items (e.g., products or services) to the invoice, such as displaying a popup window or other user interface screen that allows a user to select and/or enter details of such additional items.

The invoice also includes control 518, which allows the user to cancel or delete the invoice. Furthermore, the invoice includes control 520, which allows the user to approve the invoice and/or review and send the invoice. In some embodiments, selecting control 520 causes a preview of the invoice as it will be sent to the customer to be displayed so that the user can review and approve the final invoice for sending. When approved, the invoice may be sent to the customer, such as via email or to a software application associated with the customer.

In some embodiments, if no matches are found between data items extracted from a source electronic document and entities in a data store, then an electronic document is not automatically created. In certain embodiments, if one or more matches are determined but not enough matches to automatically create an entire electronic document, a partial electronic document may be automatically created. For example, if the customer information from a transactional email is matched to a customer in a data store but no items are matched (or only a subset of the items potentially mentioned in the email), then a partially-populated electronic invoice may be automatically created with the customer information populated but with no items or only the matched items populated, and the user may interact with the user interface to add items as appropriate. If multiple matches are determined for a given data item, the match with the highest final confidence score may be selected to populate the electronic document. If multiple matches with equal final confidence scores are determined, then multiple options may be recommended to the user via the user interface. For example, one of the matches may be selected based on some (e.g., arbitrary) condition, such as alphabetical order, and used to populate the electronic document, and the other matches with equal final confidence scores may be recommended within the user interface as alternatives.

User feedback with respect to electronic document 122, such as via one or more user interface elements or controls described with respect to FIG. 5, may be used to update the matching algorithm and/or re-train or fine-tune one or more machine learning models, as described above. In some embodiments, training, re-training, or fine-tuning of a machine learning model may be a supervised learning process that involves providing training inputs (e.g., source document content and a prompt) as inputs to the model. The model processes the training inputs and produces outputs (e.g., indicating data items extracted from the input document content, along with confidence scores for the extractions) with respect to the training inputs. The outputs are compared to labels (e.g., known data items present in the input document content) associated with the training inputs to determine the accuracy of the model, and the model is iteratively adjusted until one or more conditions are met. The machine learning model may, for example, comprise one or more neural networks. Neural networks generally include a collection of connected units or nodes called artificial neurons, which loosely model the neurons in a biological brain. The operation of neural networks can be modeled as an iterative process. Each node has a particular value associated with it. In each iteration, each node updates its value based upon the values of the other nodes, the update operation typically consisting of a matrix-vector multiplication. The update algorithm reflects the influences on each node of the other nodes in the network.

Example Operations for Automated Electronic Document Creation

Figure 6:
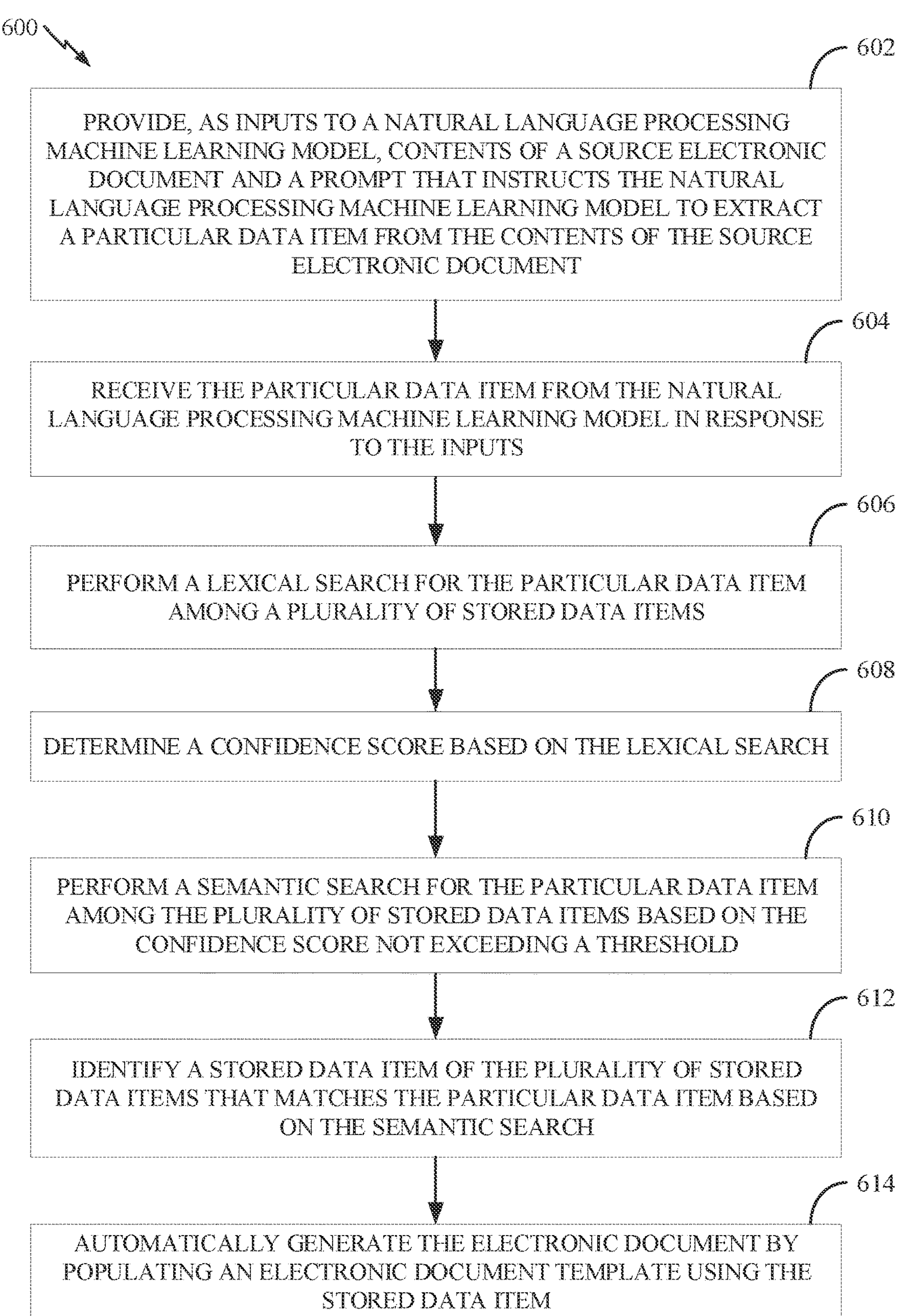
FIG. 6 depicts example operations related to automated electronic document creation.

FIG. 6 depicts example operations 600 for automated electronic document creation. For example, operations 600 may be performed by data extractor 110, data matcher 120, and/or document creator 140 of FIG. 1.

Operations 600 begin at step 602 with providing, as inputs to a natural language processing machine learning model, contents of a source electronic document and a prompt that instructs the natural language processing machine learning model to extract a particular data item from the contents of the source electronic document.

In some embodiments, providing the prompt to the natural language processing machine learning model comprises providing a plurality of conditional instructions as contextual information to the natural language processing machine learning model.

Operations 600 continue at step 604, with receiving the particular data item from the natural language processing machine learning model in response to the inputs.

Operations 600 continue at step 606, with performing a lexical search for the particular data item among a plurality of stored data items.

In some embodiments, the semantic search is performed based on a category associated with the particular data item.

In certain embodiments, the performing of the semantic search for the particular data item among the plurality of stored data items based on the confidence score not exceeding the threshold comprises generating an embedding of the particular data item using an embedding model and comparing the embedding of the particular data item to corresponding embeddings of the plurality of stored data items.

In some embodiments, the method further comprises determining a type of the lexical search to perform based on a category associated with the particular data item.

In certain embodiments, the determining of the type of the lexical search to perform based on the category of the particular data item comprises determining whether to perform an exact lexical search or a fuzzy lexical search based on a rule related to the category associated with the particular data item.

In some embodiments, the method further comprises normalizing the confidence score so that the confidence score is between zero and one.

In certain embodiments, the method further comprises applying a boost to the confidence score based on a category associated with the particular data item.

Operations 600 continue at step 608, with determining a confidence score based on the lexical search.

Operations 600 continue at step 610, with performing a semantic search for the particular data item among the plurality of stored data items based on the confidence score not exceeding a threshold.

Operations 600 continue at step 612, with identifying a stored data item of the plurality of stored data items that matches the particular data item based on the semantic search.

Operations 600 continue at step 614, with automatically generating the electronic document by populating an electronic document template using the stored data item.

Some embodiments further comprise providing corresponding contents of an associated source electronic document as an additional input to the natural language processing machine learning model, wherein the associated source electronic document is referenced by the source electronic document, and wherein the prompt further instructs the natural language processing machine learning model to extract additional data items from the corresponding contents of the associated source electronic document.

Certain embodiments further comprise receiving feedback with respect to the electronic document via a user interface, modifying the natural language processing machine learning model or a rule related to the lexical search or the semantic search based on the feedback to produce an updated natural language processing machine learning model or an updated rule, and automatically generating a subsequent electronic document based on the updated natural language processing machine learning model or the updated rule.

Notably, operations 600 is just one example with a selection of example steps, but additional methods with more, fewer, and/or different steps are possible based on the disclosure herein.

Example Computing System

Figure 7:
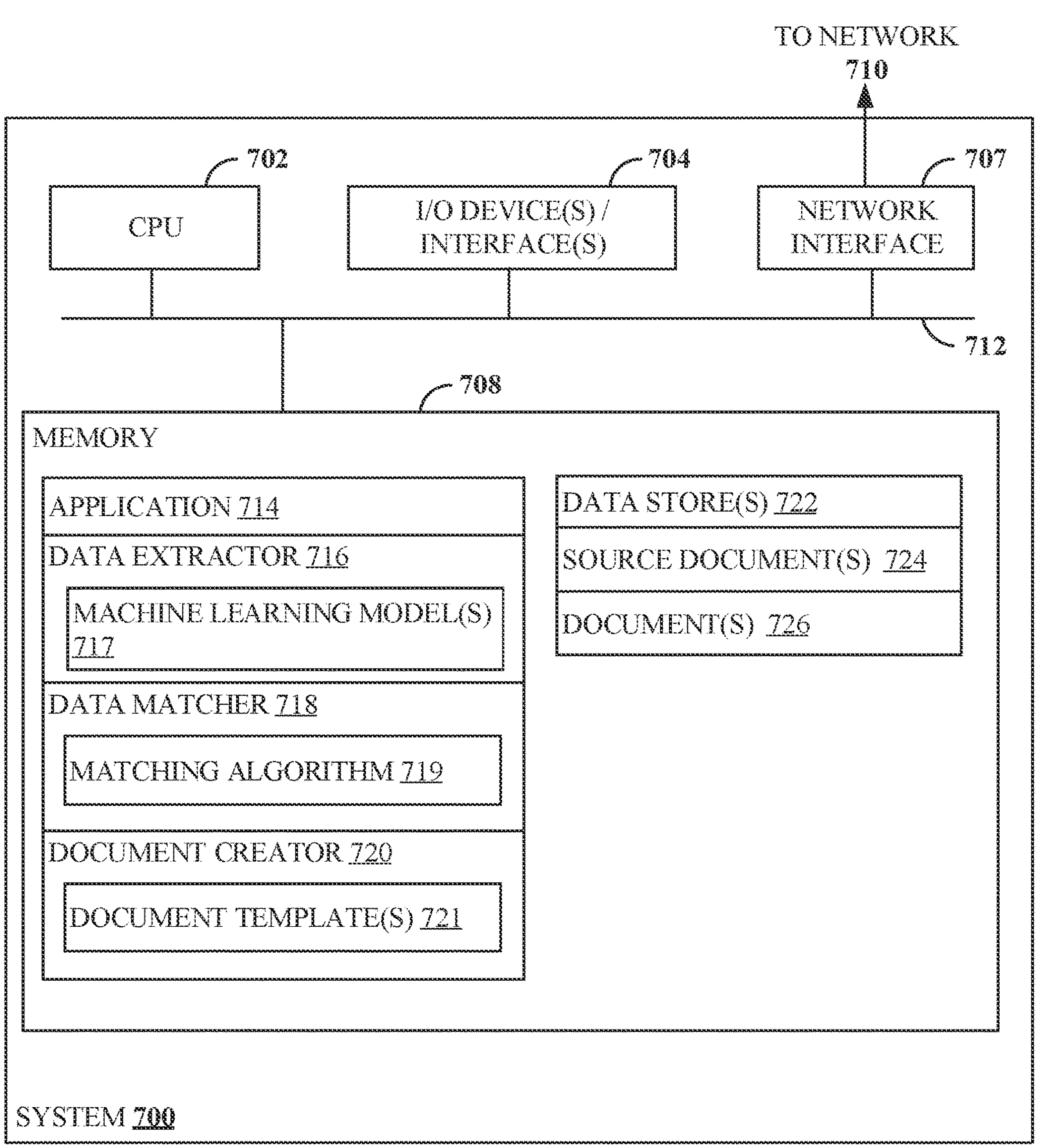
FIG. 7 depicts an example processing system for automated electronic document creation.

FIG. 7 illustrates an example system 700 with which embodiments of the present disclosure may be implemented. For example, system 700 may be configured to perform operations 600 of FIG. 6.

System 700 includes a central processing unit (CPU) 702, one or more I/O device interfaces 704 that may allow for the connection of various I/O devices 714 (e.g., keyboards, displays, mouse devices, pen input, etc.) to the system 700, network interface 706, a memory 708, and an interconnect 712. It is contemplated that one or more components of system 700 may be located remotely and accessed via a network 710. It is further contemplated that one or more components of system 700 may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes an application 714, which may be a software application that performs operations related to the electronic document creation techniques described herein. Memory 708 further includes data extractor 716, machine learning model(s) 717, data matcher 718, matching algorithm 719, document creator 720, document template(s) 721, and data store(s) 722, which may be representative of data extractor 110, machine learning model(s) 112, data matcher 120, matching algorithm 122, document creator 140, document template(s) 142, and data store(s) 130 of FIG. 1.

Memory 708 further comprises source document(s) 724 and document(s) 726, which may include electronic source document 102 and electronic document 144 of FIG. 1. Generally, system 700 is a non-limiting example, and techniques described herein may be performed by more or fewer components located on one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for automated generation of an electronic document, comprising:

providing, as inputs to a natural language processing machine learning model, contents of a source electronic document and a prompt that instructs the natural language processing machine learning model to extract a particular data item from the contents of the source electronic document;

receiving the particular data item from the natural language processing machine learning model in response to the inputs;

performing a lexical search for the particular data item among a plurality of stored data items;

determining a confidence score based on the lexical search;

performing a semantic search for the particular data item among the plurality of stored data items based on the confidence score not exceeding a threshold;

identifying a stored data item of the plurality of stored data items that matches the particular data item based on the semantic search;

automatically generating the electronic document by populating an electronic document template using the stored data item;

receiving feedback with respect to the electronic document via a user interface, wherein the natural language processing machine learning model or a rule related to the lexical search or the semantic search is modified based on the feedback to produce an updated natural language processing machine learning model or an updated rule; and automatically generating a subsequent electronic document based on the updated natural language processing machine learning model or the updated rule.

2. The method of claim 1, wherein providing the prompt to the natural language processing machine learning model comprises providing a plurality of conditional instructions as contextual information to the natural language processing machine learning model.

3. The method of claim 1, further comprising providing corresponding contents of an associated source electronic document as an additional input to the natural language processing machine learning model, wherein the associated source electronic document is referenced by the source electronic document, and wherein the prompt further instructs the natural language processing machine learning model to extract additional data items from the corresponding contents of the associated source electronic document.

4. The method of claim 1, wherein the performing of the semantic search for the particular data item among the plurality of stored data items based on the confidence score not exceeding the threshold comprises:

generating an embedding of the particular data item using an embedding model; and comparing the embedding of the particular data item to corresponding embeddings of the plurality of stored data items.

5. The method of claim 1, further comprising determining a type of the lexical search to perform based on a category associated with the particular data item.

6. The method of claim 5, wherein the determining of the type of the lexical search to perform based on the category of the particular data item comprises determining whether to perform an exact lexical search or a fuzzy lexical search based on a rule related to the category associated with the particular data item.

7. The method of claim 1, further comprising normalizing the confidence score so that the confidence score is between zero and one.

8. The method of claim 1, further comprising applying a boost to the confidence score based on a category associated with the particular data item.

9. A system for automated creation of an electronic document, comprising:

one or more processors; and a memory storing instructions that, when executed by the one or more processors, cause the system to:

provide, as inputs to a natural language processing machine learning model, contents of a source electronic document and a prompt that instructs the natural language processing machine learning model to extract a particular data item from the contents of the source electronic document;

receive the particular data item from the natural language processing machine learning model in response to the inputs;

perform a lexical search for the particular data item among a plurality of stored data items;

determine a confidence score based on the lexical search;

perform a semantic search for the particular data item among the plurality of stored data items based on the confidence score not exceeding a threshold;

identify a stored data item of the plurality of stored data items that matches the particular data item based on the semantic search;

automatically generate the electronic document by populating an electronic document template using the stored data item;

receive feedback with respect to the electronic document via a user interface, wherein the natural language processing machine learning model or a rule related to the lexical search or the semantic search is modified based on the feedback to produce an updated natural language processing machine learning model or an updated rule; and automatically generate a subsequent electronic document based on the updated natural language processing machine learning model or the updated rule.

10. The system of claim 9, wherein providing the prompt to the natural language processing machine learning model comprises providing a plurality of conditional instructions as contextual information to the natural language processing machine learning model.

11. The system of claim 9, wherein the instructions, when executed by the one or more processors, further cause the system to provide corresponding contents of an associated source electronic document as an additional input to the natural language processing machine learning model, wherein the associated source electronic document is referenced by the source electronic document, and wherein the prompt further instructs the natural language processing machine learning model to extract additional data items from the corresponding contents of the associated source electronic document.

12. The system of claim 9, wherein the performing of the semantic search for the particular data item among the plurality of stored data items based on the confidence score not exceeding the threshold comprises:

generating an embedding of the particular data item using an embedding model; and comparing the embedding of the particular data item to corresponding embeddings of the plurality of stored data items.

13. The system of claim 9, wherein the instructions, when executed by the one or more processors, further cause the system to determine a type of the lexical search to perform based on a category associated with the particular data item.

14. The system of claim 13, wherein the determining of the type of the lexical search to perform based on the category of the particular data item comprises determining whether to perform an exact lexical search or a fuzzy lexical search based on a rule related to the category associated with the particular data item.

15. The system of claim 9, wherein the instructions, when executed by the one or more processors, further cause the system to normalize the confidence score so that the confidence score is between zero and one.

16. The system of claim 9 wherein the instructions, when executed by the one or more processors, further cause the system to apply a boost to the confidence score based on a category associated with the particular data item.

17. A non-transitory computer readable medium comprising instructions that, when executed by one or more processors of a computing system, cause the computing system to:

provide, as inputs to a natural language processing machine learning model, contents of a source electronic document and a prompt that instructs the natural language processing machine learning model to extract a particular data item from the contents of the source electronic document;

receive the particular data item from the natural language processing machine learning model in response to the inputs;

perform a lexical search for the particular data item among a plurality of stored data items;

determine a confidence score based on the lexical search;

perform a semantic search for the particular data item among the plurality of stored data items based on the confidence score not exceeding a threshold;

identify a stored data item of the plurality of stored data items that matches the particular data item based on the semantic search; and automatically generate the electronic document by populating an electronic document template using the stored data item;

receive feedback with respect to the electronic document via a user interface, wherein the natural language processing machine learning model or a rule related to the lexical search or the semantic search is modified based on the feedback to produce an updated natural language processing machine learning model or an updated rule; and automatically generate a subsequent electronic document based on the updated natural language processing machine learning model or the updated rule.

18. The non-transitory computer readable medium of claim 17, wherein providing the prompt to the natural language processing machine learning model comprises providing a plurality of conditional instructions as contextual information to the natural language processing machine learning model.

* * * * *